(12) United States Patent
Kim et al.

(10) Patent No.: US 10,205,897 B2
(45) Date of Patent: Feb. 12, 2019

(54) IMAGE SENSOR AND METHOD FOR DRIVING UNIT PIXEL OF IMAGE SENSOR

(71) Applicant: SK hynix Inc., Gyeonggi-do (KR)

(72) Inventors: JIn-Seon Kim, Gyeonggi-do (KR); Woong-Hee Lee, Gyeonggi-do (KR); Tae-Hoon Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 16 days.

(21) Appl. No.: 15/251,817

(22) Filed: Aug. 30, 2016

(65) Prior Publication Data
US 2017/0237922 A1   Aug. 17, 2017

(30) Foreign Application Priority Data
Feb. 12, 2016   (KR) .................. 10-2016-0016043

(51) Int. Cl.
*H04N 5/359*   (2011.01)
*H04N 5/374*   (2011.01)
*H04N 5/378*   (2011.01)
*H01L 27/146*   (2006.01)

(52) U.S. Cl.
CPC .............................. *H04N 5/3597* (2013.01)

(58) Field of Classification Search
CPC ...... H04N 5/3507; H04N 5/374; H04N 5/378; H04N 5/3597; H04N 5/3741; H04N 5/37457; H04N 5/3745; H01L 27/146; H01L 27/14643
USPC ............ 348/308, 301, 303, 294; 250/208.1; 257/291, 292, 239; 327/142, 198
See application file for complete search history.

(56) References Cited

U.S. PATENT DOCUMENTS

| | | | |
|---|---|---|---|
| 7,053,945 B1* | 5/2006 | Xue .................. | H03K 19/01707 348/294 |
| 2004/0174450 A1* | 9/2004 | Lee ...................... | H04N 5/3597 348/308 |
| 2007/0147132 A1* | 6/2007 | Lee ...................... | H04N 3/1568 365/185.23 |
| 2008/0099807 A1* | 5/2008 | Kim .................. | H01L 27/14603 257/292 |
| 2009/0272879 A1* | 11/2009 | Dai ...................... | H04N 5/3559 250/208.1 |
| 2010/0110258 A1* | 5/2010 | Mheen .................. | H04N 5/357 348/308 |
| 2011/0036969 A1* | 2/2011 | Ahn .................. | H01L 27/14609 250/208.1 |
| 2013/0020466 A1* | 1/2013 | Ayers ................ | H01L 27/14609 250/208.1 |
| 2014/0042302 A1* | 2/2014 | Yanagita ........... | H01L 27/14603 250/208.1 |
| 2015/0372038 A1* | 12/2015 | Lee .................. | H01L 27/14643 348/294 |

FOREIGN PATENT DOCUMENTS

| KR | 100744119 | | 8/2007 | |
|---|---|---|---|---|
| KR | 10-2008-0044149 | * | 5/2008 | ............. H04N 5/357 |
| KR | 100891123 | | 4/2009 | |

* cited by examiner

*Primary Examiner* — Marly Camargo
(74) *Attorney, Agent, or Firm* — IP & T Group LLP (57) ABSTRACT

A method of driving a unit pixel may include activating a transfer signal prior to an activation of a reset signal to boost a floating diffusion node of the unit pixel, during a first section of a photodiode reset period; and activating a reset signal using a hard reset, during a second section of the photodiode reset period.

5 Claims, 6 Drawing Sheets

IMAGE SENSOR AND METHOD FOR DRIVING UNIT PIXEL OF IMAGE SENSOR

CROSS-REFERENCE TO RELATED APPLICATIONS

The present application claims priority under 35 U.S.C. 119(a) to Korean Patent Application No. 10-2016-0016043 filed on Feb. 12, 2016, which is incorporated herein by reference in its entirety.

BACKGROUND

1. Field

Exemplary embodiments of the present invention relate generally to an image sensor, such as a complementary metal oxide semiconductor (CMOS) image sensor and, more particularly, to a CMOS image sensor and a method for driving a unit pixel of the image sensor.

2. Description of the Related Art

Typically, a unit pixel of a CMOS image sensor includes a photodiode, a transfer transistor, a reset transistor, a drive transistor, and a selection transistor. In the unit pixel, photo charges generated by the photodiode are transferred through the transfer transistor to a floating diffusion node, which is an input node (i.e., a gate terminal) of the drive transistor (i.e., a source follower transistor). That is a pixel signal i.e., an output voltage of the drive transistor, is driven by the voltage of the floating diffusion node.

As the size of the unit pixel is reduced, a pinning voltage is increased to ensure a suitable dynamic range characteristic. Thus, in the case of using a hard reset, the difference between a reset level of the photodiode and a reset level of the floating diffusion node in the photodiode reset period decreases and may cause a lag phenomenon.

To prevent this lag phenomenon, it has been proposed to employ a soft reset. However, a soft reset may result in a substantial reset level variation may occur during a read-out operation.

SUMMARY

Various embodiments of the present invention are directed to an image sensor capable of substantially reducing or removing a reset level variation and a lag phenomenon by using a hard reset with boosting a floating diffusion node, and a method for driving a unit pixel included in the image sensor.

Various embodiments of the present invention are directed to a method of operating a unit pixel capable of removing a reset level variation and a lag phenomenon by timely using a soft reset and a hard reset, and an image sensor using the same.

In various embodiments of the present invention, a lag phenomenon and a reset level variation may be removed by using a hard reset and changing a rising time of a pixel control signal without deterioration of an additional timing margin.

That is, according to embodiments of the present invention, the lag phenomenon is removed by boosting a floating diffusion node using a transfer signal activation before activating a reset signal, decreasing a potential of the floating diffusion node, and increasing a potential difference between the photodiode and the floating diffusion node. Further, the reset voltage level variation, which is demerit of a soft reset, is removed by using a hard reset. Thus, the deterioration of an image quality caused by the lag phenomenon and the reset voltage level variation may be improved.

In an embodiment of the present invention, a method of driving a unit pixel may include activating a transfer signal prior to an activation of a reset signal to boost a floating diffusion node of the unit pixel, during a first section of a photodiode reset period; and activating a reset signal using a hard reset, during a second section of the photodiode reset period.

In an embodiment of the present invention, a method of driving a unit pixel may include activating a reset signal by a first power voltage; activating a transfer signal with keeping a state of the reset signal to boost a floating diffusion node of the unit pixel; and changing the state of the reset signal by a second power voltage, higher than the first power voltage, when a predetermined time passes after the transfer signal is activated.

In an embodiment of the present invention, an image sensor may include a unit pixel suitable for generating a pixel signal corresponding to an incident light; power voltage supply unit suitable for supplying a second power voltage that is higher than a first power voltage used in the unit pixel; and a reset voltage selection unit suitable for, based on a reset control signal, selectively providing the first power voltage or the second power voltage second power voltage as a reset voltage of a reset signal, to the unit pixel, during a photodiode reset period.

BRIEF DESCRIPTION OF THE DRAWINGS

The above and other features and advantages of the present invention will become more apparent to those skilled in the art to which the present invention belongs by describing in detail various embodiments thereof with reference to the attached drawings in which.

DETAILED DESCRIPTION

Various embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Throughout the specification, when an element is referred to as being "coupled" to another element, it may not only indicate that the elements are "directly coupled" to each other, but also indicate that the elements are "electrically coupled" to each other with another element interposed therebetween.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

The terminology used herein is for the purpose of describing particular embodiments only and is not intended to be limiting of the present invention. As used herein, singular forms are intended to include the plural forms as well unless the context clearly indicates otherwise.

It will be further understood that the terms "comprises," is "comprising," "includes," and "including," when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or is in combination with other features or elements of another embodiment, unless otherwise specifically indicated.

Hereinafter, the various embodiments of the present invention will be described in detail with reference to the attached drawings.

Firstly, in the following description, a soft reset means that a first power voltage VDD, i.e., a drain voltage, is applied to a gate terminal of a reset transistor in a photodiode reset period. A hard reset means that a second power voltage VPP is applied to the gate terminal of the reset transistor in the photodiode reset period, the second power voltage VPP having a higher voltage level than the first power voltage VDD.

Figure 1:
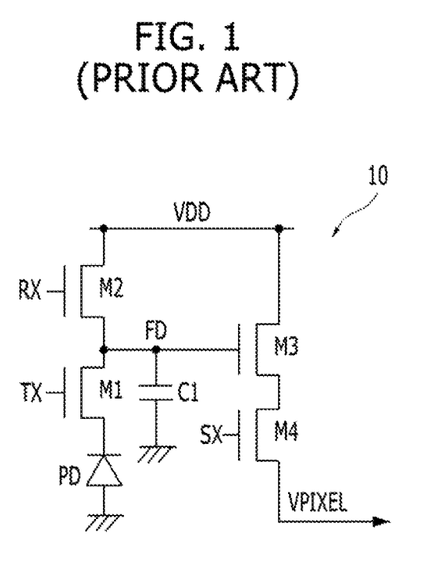
FIG. 1 is a circuit diagram illustrating a conventional unit pixel.

FIG. 1 is a circuit diagram illustrating a conventional unit pixel.

Referring to FIG. 1, the pixel unit 10 includes a photodiode PD, a transfer transistor M1, a reset transistor M2, a drive transistor M3 and a selection transistor M4.

The photodiode PD performs a photoelectric conversion function converting incident light into photo charges.

The transfer transistor M1 transfers photo charges generated by the photodiode PD to a floating diffusion node FD coupled to the other terminal of the transfer transistor M1 in response to a transfer signal TX applied to a gate terminal thereof.

The reset transistor M2 resets the floating diffusion node FD with a drain voltage VDD in response to a reset signal RX applied to a gate terminal thereof. Herein, the drain voltage VDD may be an initial voltage of the floating diffusion node FD.

The drive transistor (i.e., a source follower transistor) M3 is coupled to the drain voltage VDD. The drive transistor M3 generates an electrical signal corresponding to charges accumulated on the floating diffusion node FD which is coupled to a gate terminal thereof.

The selection transistor M4, in response to a selection signal SX applied to a gate terminal thereof, outputs the electrical signal that is driven by the drive transistor M3 as a pixel signal VPIXEL.

Herein, the floating diffusion node FD is a diffusion region that is commonly coupled to the transfer transistor M1 and the reset transistor M2. Since charges corresponding to an image signal or an initial voltage are accumulated on the floating diffusion node FD, the floating diffusion node FD may be modeled as a capacitor C1.

Herein, the charges corresponding to the drain voltage VDD, i.e., the initial voltage, which is driven through the reset transistor M2, are accumulated on the floating diffusion node FD. That is, the reset transistor M2 is turned on and initializes the floating diffusion node FD. And then, the transfer transistor M1 is turned on and the charges corresponding to the image signal (i.e., incident light) are transferred from the photodiode PD to the floating diffusion node.

Figure 2A:
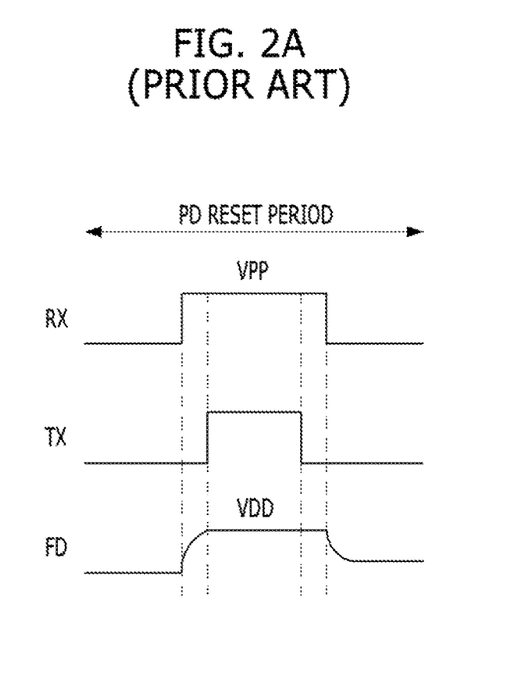
FIGS. 2A to 2D are diagrams describing an operation of a conventional unit pixel in a photodiode reset period.
Figure 2B:
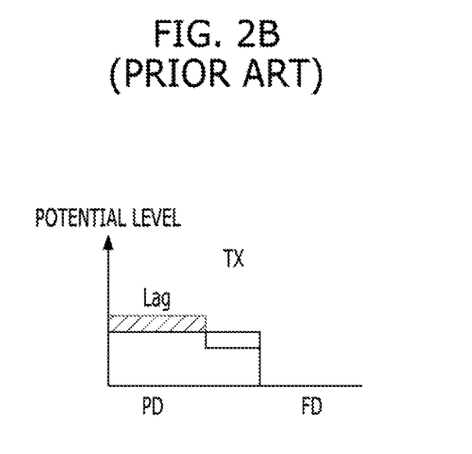
Figure 2C:
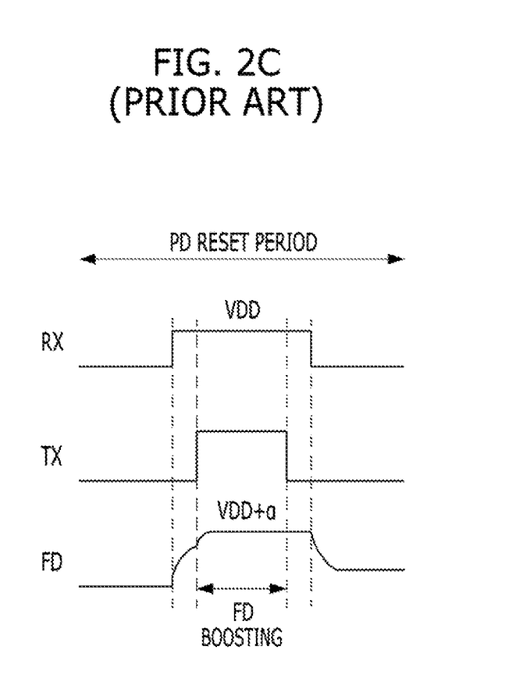
Figure 2D:
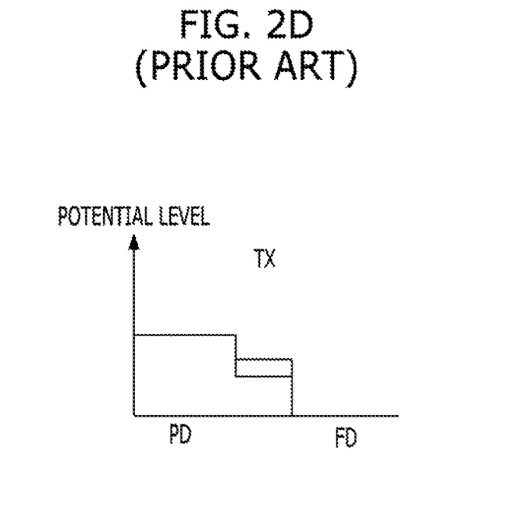

FIGS. 2A to 2D describe an operation of the unit pixel shown in FIG. 1, in a photodiode reset period. More specifically, FIGS. 2A and 2B show timing and potential levels in the photodiode reset period using a hard reset. FIGS. 2C and 2D show timing and potential levels in the photodiode reset period in case of using a soft reset.

In general, as the size of a unit pixel is reduced, a pinning voltage is increased to ensure a dynamic range characteristic.

As shown in FIG. 2A, when using a hard reset and performing a reset signal rising (i.e., a reset signal activation) before a transfer signal rising (i.e., a transfer signal activation) in a photodiode reset period, since a potential of the photodiode PD is lowered when the photodiode PD is reset, the voltage difference between the photodiode PD and the floating diffusion node FD is decreased.

Thus, as shown in FIG. 2B, since the charges of the photodiode PD are not completely discharged, a lag phenomenon is likely to occur.

In order to prevent the occurrence of the lag phenomenon, as shown in FIGS. 2C and 2D, the potential difference between the photodiode PD and the floating diffusion node FD is increased by activating the reset signal before the transfer signal activation in the photodiode reset period, using a soft reset, boosting the floating diffusion FD node and decreasing the potential voltage of the floating diffusion FD node.

However, such a soft reset has a concern in that a reset level variation may occur during a read-out operation. Herein, the reason why the reset level varies when using the soft reset will be described as below. In case of using the soft reset, since a gate terminal and a drain terminal of the reset transistor M2 have the same voltage (i.e., the first power voltage VDD) the reset transistor M2 may operate at a weak inversion state when an initial voltage of the floating diffusion node FD is set to a high voltage under low illuminance. When the reset transistor M2 operates at the weak inversion state, the reset level varies according to a voltage level of the floating diffusion node FD by a minute electric current.

Thus, in an embodiment of the present invention, in order to remove the lag phenomenon and the reset level variation, the hard reset is used and the floating diffusion node FD is boosted while activating the transfer signal prior to the reset signal activation. This will be described in details with reference to FIG. 3.

Moreover, in an embodiment of the present invention, in order to remove the lag phenomenon and the reset level variation the soft reset is used at the transfer signal activation timing, and the hard reset is used when a predetermined time passes after the transfer signal activation timing. This will be described in details with reference to FIGS. 4 to 6.

Figure 3:
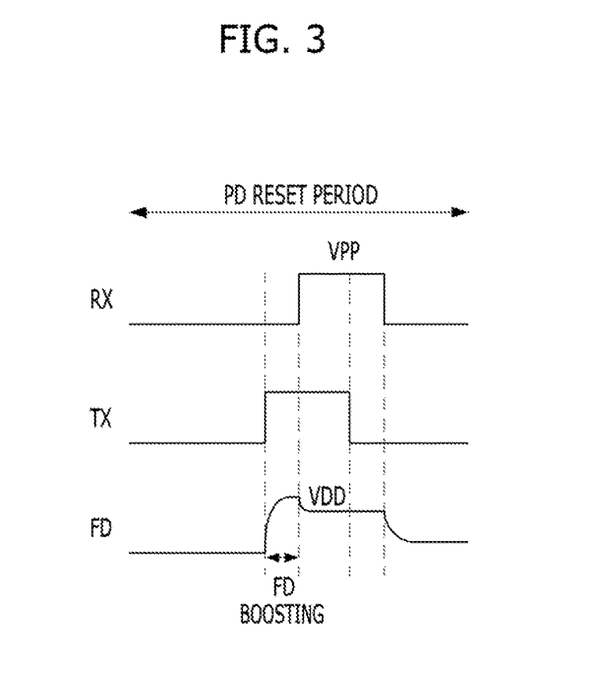
FIG. 3 is a timing diagram describing an operation of a unit pixel in a photodiode reset period, according to an embodiment of the present invention.

FIG. 3 is a timing diagram describing a unit pixel operation during a photodiode reset period, according to an embodiment of the present invention.

As illustrated in FIG. 3, unlike the prior art method discussed in reference to FIGS. 2A (hard reset) and 2C (soft reset) the transfer signal Tx is rising before the reset signal Rx. In other words, the transfer signal Tx is activated before activating the reset signal Rx during a first section of the PD reset period. During the first section of the PD period, the transfer transistor M1 is turned on whereas the reset transistor M2 remains turned off, and, hence, photo charges generated by the photodiode PD are transferred to the floating diffusion node FD to thereby boost, i.e., increase the voltage of the floating diffusion node FD.

Subsequently, after the voltage of the floating diffusion node FD has been sufficiently boosted, the reset signal RX is activated using the hard reset, i.e., the reset signal RX is activated using the second power voltage VPP level which is higher than the first power voltage VDD while keeping the transfer signal TX activated, during a second section of the PD reset period. That is, after the potential of the floating diffusion node FD was sufficiently increased by the boosting of the floating diffusion node FD, the reset signal Rx is activated using the hard reset. Since the charges of the photodiode PD have been already transferred to the floating diffusion node FD when the reset signal Rx is activated, the lag phenomenon does not occur. Further, the reset level variation does not occur by using the hard reset as described above, in the case of using the soft reset, the reset voltage level varies, whereas in the case of using the hard reset, since the reset transistor M2 operates in a fully-turn-on state, the reset voltage level is fixed and is not varied.

Referring further to FIG. 3, the transfer signal TX is deactivated while keeping the level of the reset, signal RX steady, during a third section of the PD reset period and then subsequently, the reset signal RX is deactivated. As can be seen, the voltage level of the floating diffusion node FD decreases slightly when the reset signal Rx is activated and reaches a constant value within a very brief initial transition period during the period of activation of the reset signal R. Then, when the reset signal Rx is deactivated the floating diffusion node transitions to an even lower lever.

Figure 4:
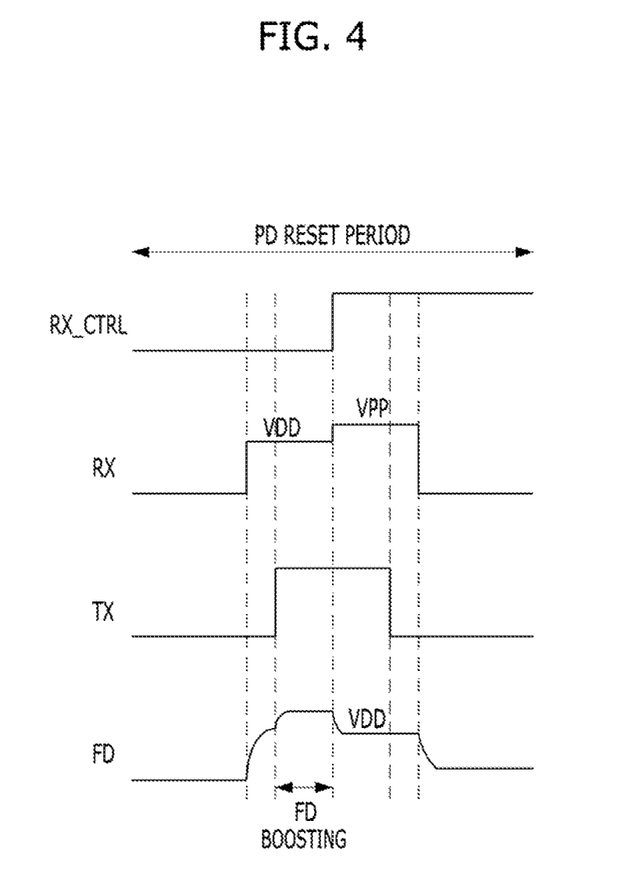
FIG. 4 is a timing diagram describing an operation of a unit pixel in a photodiode reset period, according to an embodiment of the present invention.

FIG. 4 is a timing diagram describing an operation of a unit pixel in a photodiode reset period, according to another embodiment of the present invention.

Firstly, the reset signal is risen (i.e., activated) using the soft reset, (i.e., using the first voltage VDD) before the transfer signal is risen (i.e., activated), during a first section of the PD reset period. During this first section of the photodiode reset period the reset transistor M2 is switched on whereas the transfer transistor M1 is switched off, hence the floating diffusion node is driven to the voltage of the reset transistor VDD.

Then, the transfer signal Tx is risen (i.e., activated) while maintaining the soft reset state (i.e., continue to apply voltage VDD to the reset transistor M2) during a second section of the PD reset period. In this manner, the potential difference between the photodiode PD and the floating diffusion node FD is increased and the lag phenomenon is removed by boosting of the floating diffusion node FD and decreasing the potential of the floating diffusion node FD.

Subsequently, in a third section of the PD reset period, the reset operation is consecutively performed by changing the reset manner to the hard reset (applying the VPP voltage) when a predetermined time passes after the transfer signal TX is activated. Herein the reset manner is changed from the soft reset to the hard reset in response to a reset control signal RX_CTRL applied from an external control circuit (not shown), e.g., a timing generator. The predetermined time is required for boosting the floating diffusion node FD. For example, as shown in FIG. 4, the predetermined time may correspond to "a half of a transfer signal activation section". Further, the predetermined time may correspond to "one-third of a transfer signal activation section", or "two-thirds of a transfer signal activation section". This way, the reset level variation does not occur by using the hard reset.

Subsequently, in a fourth section of the PD reset period, the transfer signal TX is deactivated while keeping the level of the reset signal RX, and then the reset signal RX is deactivated.

Figure 5:
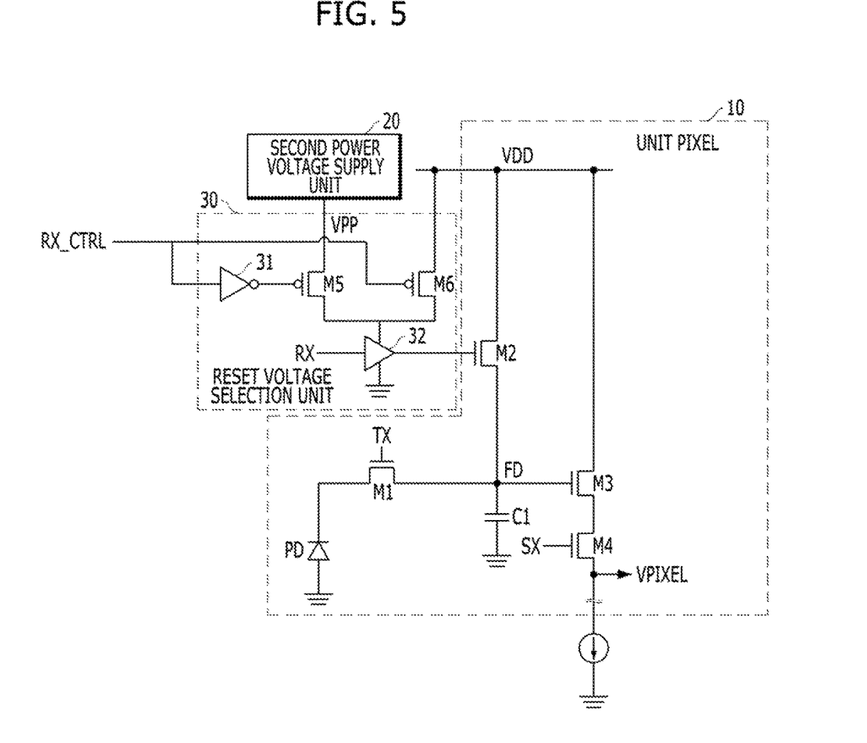
FIG. 5 is a block diagram illustrating an age sensor, according to an embodiment of the present invention.
Figure 6:
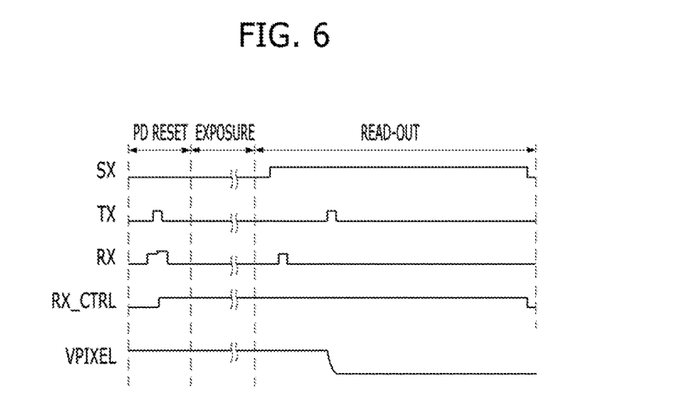
FIG. 6 is a timing diagram for describing an operation of the image sensor shown in FIG. 5.

FIG. 5 is a block diagram illustrating an it gage sensor according to another embodiment of the present invention. FIG. 6 is a timing diagram for describing an operation of the image sensor shown in FIG. 5.

As shown in FIG. 5, the image sensor may include a unit pixel 10, a second power voltage (VPP) supply unit 20, and a reset voltage selection unit 30.

The unit pixel 10 outputs a pixel signal VPIXEL corresponding to an incident light. The unit pixel 10 has a configuration similar to the conventional unit pixel shown in FIG. 1.

The second power voltage supply unit 20 supply a second power voltage VPP to the reset voltage selection unit 30. The second power voltage VPP is higher than a first power voltage VDD that is supplied to the unit pixel 10.

The reset voltage selection unit 30 selectively provides the first power voltage VDD or the second power voltage VPP as a reset voltage (i.e., a reset signal RX) to the unit pixel 10. That is, the reset signal RX may be activated with the first power voltage VDD or the second power voltage VPP in response to a reset control signal RX_CTRL.

More specifically, the reset voltage selection unit 30 selects the first power voltage VDD as the reset voltage in response to the reset control signal RX_CTRL during an initial period of the reset signal activation section. For reference, as shown in FIG. 4, the initial period of the reset signal activation section starts from the reset signal activation timing. During the initial period of the reset signal activation section, the transfer signal TX is activated, and the initial period may be maintained for a predetermined time after the transfer signal activation timing.

Further, the reset voltage selection unit 30 selects the second power voltage VPP as the reset voltage in response to the reset control signal RX_CTRL during the remaining period of the reset signal activation section. For reference, as shown in. FIG. 4, during the remaining period of the reset signal activation section, the transfer signal TX is deactivated and subsequently the reset signal RX is deactivated.

The reset voltage selection unit 30 may include an inverter 31, a buffer 32, a first PMOS transistors M5 and a second PMOS transistor M6. In response to the reset control signal RX_CTRL, the first power voltage VDD or the second power voltage VPP is selectively provided to a gate terminal of the reset transistor M2.

When the reset control signal RX_CTRL is in a logic low the first PMOS transistor M5 is turned off, and the second PMOS transistor M6 is turned on. Accordingly the second PMOS transistor M6 provides the first power voltage VDD to the buffer 32 (i.e., a pull-up driving voltage terminal of the buffer 32).

When the reset control signal RX_CTRL is in a logic high level, the first PMOS transistor M5 is turned on, and the second PMOS transistor M6 is turned off. Accordingly, the first PMOS transistor M5 provides the second power voltage VPP supplied from the second power voltage supply unit 20 to the buffer 32 (i.e., the pull-up driving voltage terminal of the buffer 32).

The buffer 32 receives the reset signal RX to apply the reset signal RX having an activation level of the first power voltage VDD or the second power voltage VPP, to the gate terminal of the reset transistor M2 of the unit pixel 10.

Further, a PD reset period, an exposure period and a read-out period are shown in FIG. 6.

The PD reset period may be the same period as the PD reset period shown in FIG. 4. The exposure period and the read-out period are widely known in the art, and thus descriptions for the operations during each period are omitted here.

Figure 7:
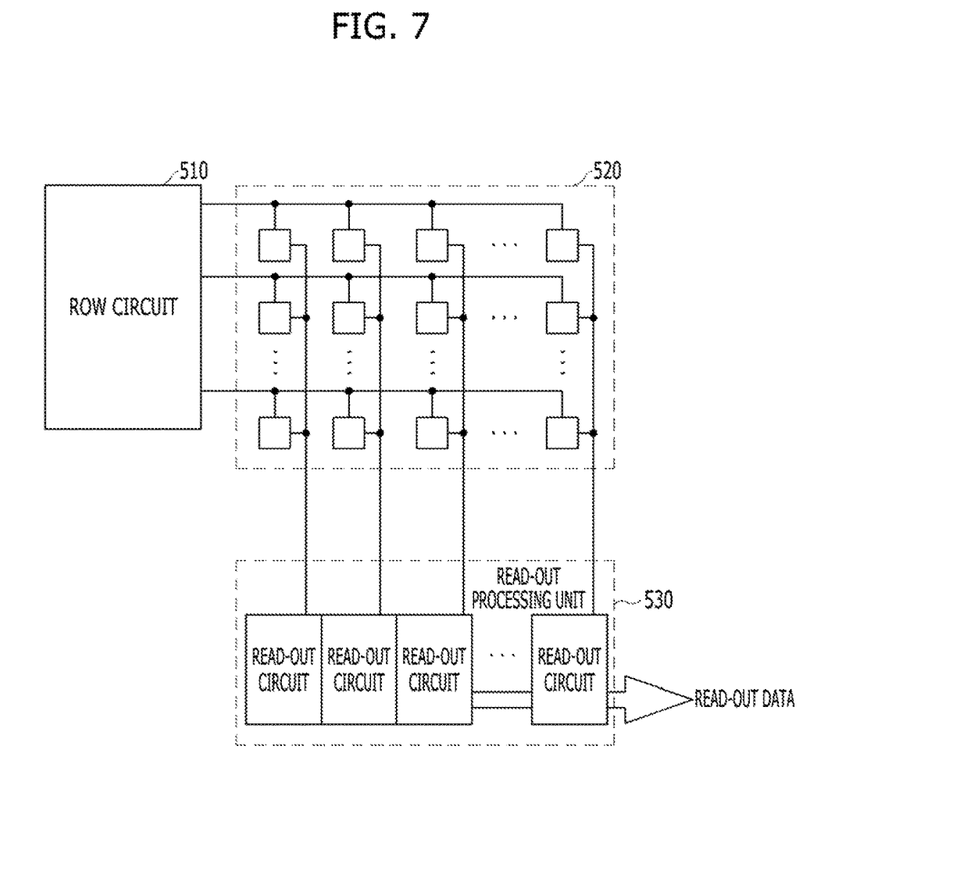
FIG. 7 is a block diagram illustrating a CMOS image sensor, according to an embodiment of the present invention.

FIG. 7 is a block diagram illustrating a CMOS image sensor, according to an embodiment of the present invention.

As shown in FIG. 7 the CMOS image sensor may include a row circuit 510, a pixel array 520 and a read-out processing unit 530.

The row circuit 510 may include a row decoder and a row driver. The row circuit 510 drives pixels, which are selected by the row decoder, among a plurality of pixels (i.e., unit pixels) included in the pixel array 520.

The pixel array 520 detects the incident light, and generates a pixel signal corresponding to a detected light. That is, the pixel, which is selected by the row decoder and is driven by the row driver, among the pixels included in the pixel array 520 outputs the pixel signal. The outputted pixel signal is an analog signal and includes a reset voltage and a signal voltage. Each of the pixels included in the pixel array 520 may have the configurations and operations that are similar to the unit pixel 10 shown in FIG. 5.

The read-out processing unit 530 read-outs the pixel signal outputted from the pixel array 520 to generate the read-out data (i.e., a digital signal).

According to embodiments of the present invention, the lag phenomenon and the reset level variation may be removed by timely using a soft reset and a hard reset. A floating diffusion node of a unit pixel may be boosted at a transfer signal activation timing while a soft reset is used. Thus, the deterioration of an image quality caused by the lag phenomenon and the reset level variation may be improved.

Although various embodiments of the present invention have been described for illustrative purposes, it will be apparent to those skilled in the art that various changes and modifications may be made without departing from the spirit and scope of the invention as defined in the following claims.

What is claimed is:

1. A method of driving a unit pixel, comprising:
activating a transfer signal with a first power voltage prior to an activation of a reset signal to boost a floating diffusion node of the unit pixel, during a first section of a photodiode reset period; and
activating the reset signal with a second power voltage, having a voltage level higher than the first power voltage, while keeping the transfer signal activated with the first power voltage, during a second section of the photodiode reset period.

2. The method of claim 1, further comprising:
deactivating the transfer signal while maintaining a level of the reset signal, during a third section of the photodiode reset period.

3. An image sensor, comprising:
a unit pixel suitable for generating a pixel signal corresponding to an incident light;
a power voltage supply unit suitable for supplying a second power voltage that is higher than a first power voltage used in the unit pixel; and
a reset voltage selection unit suitable for, based on a reset control signal, selectively providing the first power voltage or the second power voltage as a reset voltage of a reset signal, to the unit pixel, during a photodiode reset period,
wherein the reset signal is activated with the second power voltage while keeping a transfer signal activated with the first power voltage, during the photodiode reset period.

4. The image sensor of claim 3, wherein:
during a first section of the photodiode reset period, the reset signal is activated with the first power voltage;
during a second section of the photodiode reset period, a transfer signal is activated while the reset signal is activated with the first power voltage;
during a third section of the photodiode reset period, the activated level of the reset signal is changed in respond to a transition of the reset control signal to the second power voltage while keeping the transfer signal being activated; and
during a fourth section of the photodiode reset period, the transfer signal is deactivated while the reset signal is activated with the second power voltage, and then the reset signal is deactivated.

5. The image sensor of claim 3, wherein the reset voltage selection unit comprises:
a first PMOS transistor suitable for providing the second power voltage supplied from the second power voltage supply unit in response to the reset control signal;
a second PMOS transistor suitable for providing the first power voltage in response to the reset control signal; and
a buffer suitable for receiving the reset signal to apply the reset signal, having an activation level of the first power voltage and the second power voltage, to a gate terminal of a reset transistor of the unit pixel.

* * * * *

UNITED STATES PATENT AND TRADEMARK OFFICE
CERTIFICATE OF CORRECTION

PATENT NO.       : 10,205,897 B2
APPLICATION NO.  : 15/251817
DATED            : February 12, 2019
INVENTOR(S)      : Jin-Seon Kim et al.

Page 1 of 1

It is certified that error appears in the above-identified patent and that said Letters Patent is hereby corrected as shown below:

On the Title Page

Item (72) please correct first inventor's name from JIn-Seon KIM to Jin-Seon KIM Signed and Sealed this
Fourth Day of June, 2019

Andrei Iancu
*Director of the United States Patent and Trademark Office*